US012811796B2

(12) United States Patent
Chung et al.

(10) Patent No.: US 12,811,796 B2
(45) Date of Patent: Nov. 24, 2026

(54) UPDATING SYSTEM AND METHOD THAT PREVENT UNAUTHORIZED MODIFICATION OF INFORMATION

(71) Applicant: Automotive Research & Testing Center, Lugong (TW)

(72) Inventors: Kuo-Chen Chung, Lugong (TW); Chih-Hung Kuo, Lugong (TW); Ting-You Lin, Lugong (TW); Yao-Chung Liu, Lugong (TW); Yan-Ting Lin, Lugong (TW); Shih-Cheng Lin, Lugong (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 20 days.

(21) Appl. No.: 19/182,148

(22) Filed: Apr. 17, 2025

(65) Prior Publication Data

US 2026/0332427 A1 Oct. 22, 2026

(51) Int. Cl.
*H04L 9/32* (2006.01)

(52) U.S. Cl.
CPC .................................. *H04L 9/3236* (2013.01)

(58) Field of Classification Search
CPC ......................................................... H04L 9/32
See application file for complete search history.

(56) References Cited

U.S. PATENT DOCUMENTS 9,464,905 B2 10/2016 Lewis
2003/0177347 A1* 9/2003 Schneier ................. A63F 13/12 713/151
2011/0064216 A1* 3/2011 Naccache ............. H04L 9/3247 380/28
2011/0320089 A1 12/2011 Lewis
2015/0193629 A1* 7/2015 Hajost ................... H04L 9/0869 713/189
(Continued)

FOREIGN PATENT DOCUMENTS

CN 109495307 A 3/2019
CN 113365244 A 9/2021
(Continued)

*Primary Examiner* — Ponnoreay Pich
(74) *Attorney, Agent, or Firm* — Birch, Stewart, Kolasch & Birch, LLP

(57) ABSTRACT

A client device is connected to a server device. The server device stores original and encrypted update files and reference pre-encryption and post-encryption hash values, and sends the encrypted update file to the client device. The client device decrypts the encrypted update file to obtain the original update file, calculates an asserted post-encryption hash value based on the encrypted update file and an asserted pre-encryption hash value based on the original update file, and sends the asserted post-encryption hash value and the asserted pre-encryption hash value to the server device. The server device determines whether the asserted post-encryption hash value conforms with the reference post-encryption hash value and whether the asserted pre-encryption hash value conforms with the reference pre-encryption hash value, and generates and sends an update command to the client device to enable the client device to implement an update process when both results of determinations are positive.

9 Claims, 5 Drawing Sheets

(56) References Cited

U.S. PATENT DOCUMENTS

| | | | | |
|---|---|---|---|---|
| 2016/0092701 | A1* | 3/2016 | Shah | H04W 4/60<br>713/189 |
| 2023/0254302 | A1* | 8/2023 | Ramezanpour | H04L 9/3273<br>713/156 |

FOREIGN PATENT DOCUMENTS

| | | | |
|---|---|---|---|
| CN | 118114233 | A | 5/2024 |
| CN | 118259947 | A | 6/2024 |
| CN | 118612209 | A | 9/2024 |

* cited by examiner

UPDATING SYSTEM AND METHOD THAT PREVENT UNAUTHORIZED MODIFICATION OF INFORMATION

FIELD

The disclosure relates to an updating system and an updating method that prevent unauthorized modification of information.

BACKGROUND

When using conventional system updating techniques, technicians may encounter problems such as: 1) experiencing difficulties in simultaneously downloading an update file and implementing an update process using the update file within a preset time period; 2) being unable to check whether the downloaded update file has been maliciously modified or not; and 3) being unable to check whether a source of the downloaded update file is correct or not.

SUMMARY

Therefore, an object of the disclosure is to provide an updating system and an updating method that prevent unauthorized modification of information that can alleviate at least one of the drawbacks of the prior art.

According to one aspect of the disclosure, the updating system includes a client device, and a server device that is electrically connected to the client device.

The server device stores an original update file for updating the client device, an encrypted update file that is obtained by encrypting the original update file with an algorithm for encryption and decryption, a reference pre-encryption hash value that is calculated by using a hashing algorithm based on the original update file, and a reference post-encryption hash value that is calculated by using the hashing algorithm based on the encrypted update file. The server device sends the encrypted update file to the client device.

The client device decrypts the encrypted update file with the algorithm for encryption and decryption to obtain the original update file in response to receipt of the encrypted update file from the server device. The client device calculates an asserted post-encryption hash value by using the hashing algorithm based on the encrypted update file thus received, and sends the asserted post-encryption hash value to the server device. The client device calculates an asserted pre-encryption hash value by using the hashing algorithm based on the original update file that is obtained by decrypting the encrypted update file, and sends the asserted pre-encryption hash value to the server device.

The server device determines whether the asserted post-encryption hash value received from the client device conforms with the reference post-encryption hash value, and determines whether the asserted pre-encryption hash value received from the client device conforms with the reference pre-encryption hash value. The server device generates and sends to the client device an update command for enabling the client device to implement an update process in response to determining that the asserted post-encryption hash value conforms with the reference post-encryption hash value and that the asserted pre-encryption hash value conforms with the reference pre-encryption hash value.

The client device implements the update process using the original update file in response to receipt of the update command.

According to another aspect of the disclosure, the updating method is to be implemented by the server device that is previously described. The updating method includes steps of:

sending the encrypted update file to the client device to enable the client device to calculate an asserted post-encryption hash value by using the hashing algorithm based on the encrypted update file, and to send the asserted post-encryption hash value to the server device;

in response to receipt of the asserted post-encryption hash value from the client device, determining whether the asserted post-encryption hash value conforms with the reference post-encryption hash value;

in response to determining that the asserted post-encryption hash value conforms with the reference post-encryption hash value, generating and sending a first update command to the client device to enable the client device to decrypt the encrypted update file with the algorithm for encryption and decryption to obtain the original update file, to calculate an asserted pre-encryption hash value by using the hashing algorithm based on the original update file that is obtained by decrypting the encrypted update file, and to send the asserted pre-encryption hash value to the server device;

in response to receipt of the asserted pre-encryption hash value from the client device, determining whether the asserted pre-encryption hash value conforms with the reference pre-encryption hash value; and in response to determining that the asserted pre-encryption hash value conforms with the reference pre-encryption hash value, generating and sending to the client device a second update command to enable the client device to implement an update process using the original update file.

According to still another aspect of the disclosure, the updating method is to be implemented by the client device that is previously described. The updating method includes steps of:

in response to receipt of the encrypted update file from the server device, calculating an asserted post-encryption hash value by using the hashing algorithm based on the encrypted update file, and sending the asserted post-encryption hash value to the server device to enable the server device to generate and send a first update command to the client device when the server device determines that the asserted post-encryption hash value conforms with the reference post-encryption hash value;

in response to receipt of the first update command, decrypting the encrypted update file with the algorithm for encryption and decryption to obtain the original update file, calculating an asserted pre-encryption hash value by using the hashing algorithm based on the original update file that is obtained by decrypting the encrypted update file, and sending the asserted pre-encryption hash value to the server device to enable the server device to generate and send a second update command to the client device when the server device determines that the asserted pre-encryption hash value conforms with the reference pre-encryption hash value; and in response to receipt of the second update command, implementing an update process using the original update file.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
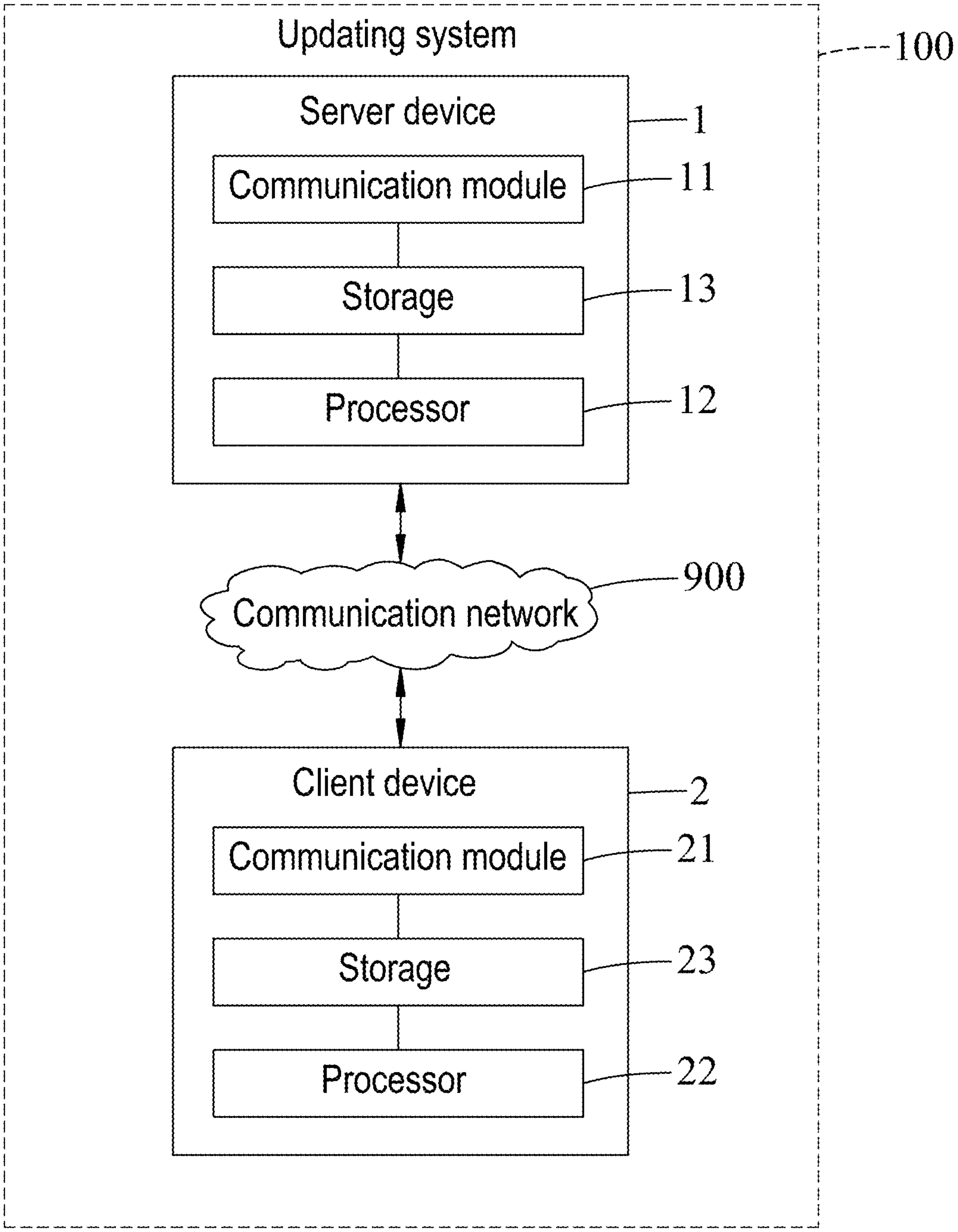
FIG. 1 is a block diagram illustrating an updating system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of an updating system 100 that prevents unauthorized modification of information according to the disclosure is illustrated. The updating system 100 includes a server device 1 and a client device 2 that are electrically connected to each other. In particular, the client device 2 is in communication with the server device 1 via a communication network 900. The server device 1 may be implemented to be a desktop computer, a laptop computer, a notebook computer, a tablet computer, a computing server or a data server, but implementation thereof is not limited to what are disclosed herein and may vary in other embodiments. The client device 2 may be implemented to be an in-vehicle device mounted on a vehicle, but implementation thereof is not limited to what are disclosed herein and may vary in other embodiments.

The server device 1 includes a communication module 11, a storage 12, and a processor 13 that is electrically connected to the communication module 11 and the storage 12. The processor 13 of the server device 1 may be implemented by a central processing unit (CPU), a microprocessor, a micro control unit (MCU), a system on a chip (SoC), or any circuit configurable/programmable in a software manner and/or hardware manner to implement functionalities discussed in this disclosure. The storage 12 of the server device 1 may be implemented by random access memory (RAM), double data rate synchronous dynamic random access memory (DDR SDRAM), read only memory (ROM), programmable ROM (PROM), flash memory, a hard disk drive (HDD), a solid state disk (SSD), electrically-erasable programmable read-only memory (EEPROM) or any other volatile/non-volatile memory devices, but is not limited thereto. The communication module 11 of the server device 1 may be implemented to be a network interface controller or a wireless transceiver that supports wireless communication standards, such as Bluetooth® technology standards, Wi-Fi technology standards and/or cellular network technology standards, but is not limited thereto.

The client device 2 includes a communication module 21, a storage 22, and a processor 23 that is electrically connected to the communication module 21 and the storage 22. The processor 23 of the client device 2 may be implemented by a CPU, a microprocessor, a MCU, an SoC, or any circuit configurable/programmable in a software manner and/or hardware manner to implement functionalities discussed in this disclosure. The storage 22 of the client device 2 may be implemented by RAM, DDR SDRAM, ROM, PROM, flash memory, an HDD, an SSD, EEPROM or any other volatile/non-volatile memory devices, but is not limited thereto. The communication module 21 of the client device 2 may be implemented to be a network interface controller or a wireless transceiver that supports wireless communication standards, such as Bluetooth® technology standards, Wi-Fi technology standards and/or cellular network technology standards, but is not limited thereto.

The storage 12 of the server device 1 stores an original update file for updating the client device 2, an encrypted update file that is obtained by encrypting the original update file with an algorithm for encryption and decryption, a reference pre-encryption hash value that is calculated by using a hashing algorithm based on the original update file, and a reference post-encryption hash value that is calculated by using the hashing algorithm based on the encrypted update file. The algorithm for encryption and decryption is a symmetric-key algorithm, e.g., an algorithm described by the specification of advanced encryption standard 128, but is not limited thereto. The hashing algorithm is exemplarily MD5, SHA-1, SHA-256, or the like, but is not limited thereto.

Figure 2:
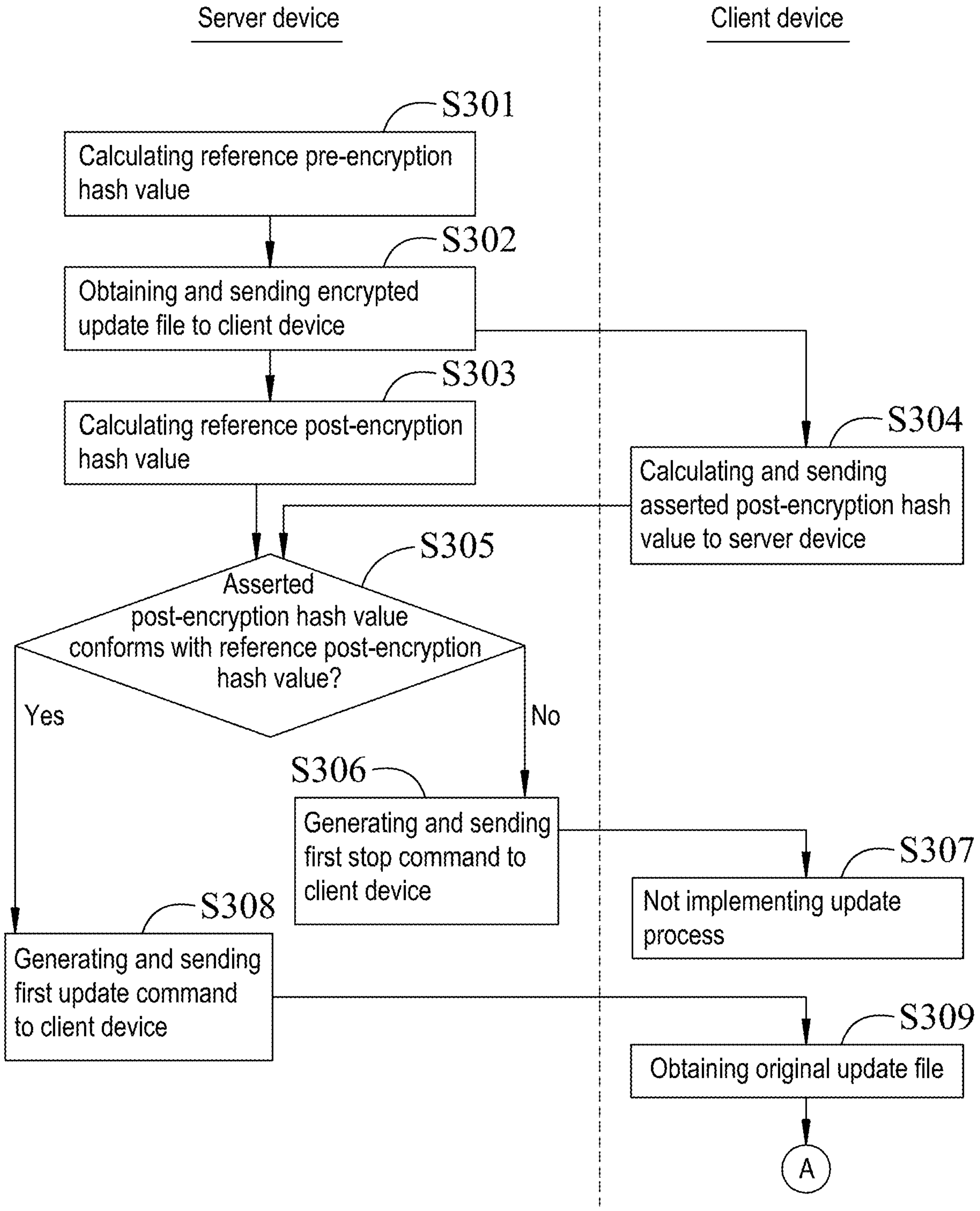
FIGS. 2 to 4 are flow charts cooperatively illustrating an updating method according to a first embodiment of the disclosure.
Figure 3:
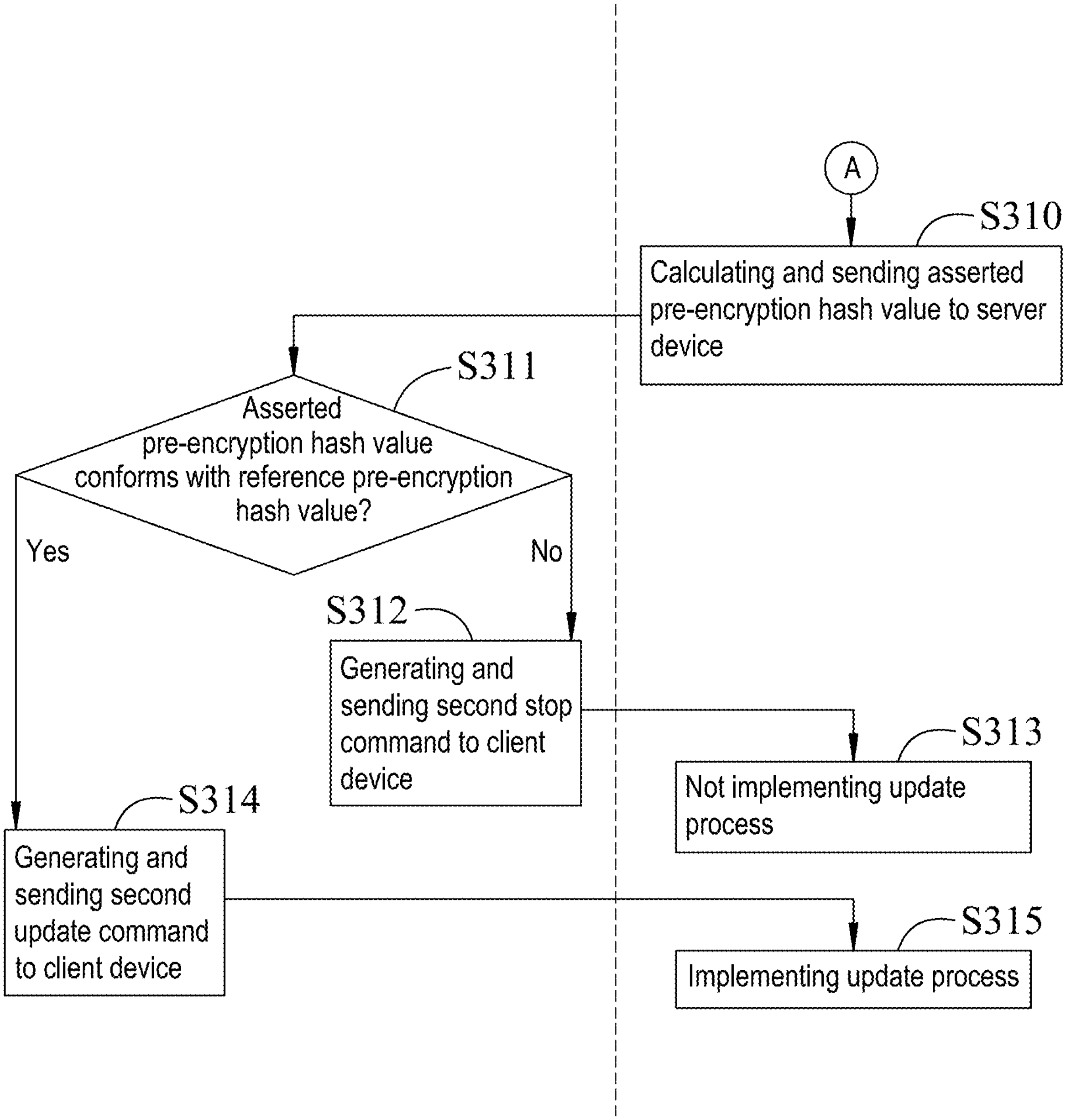
Figure 4:
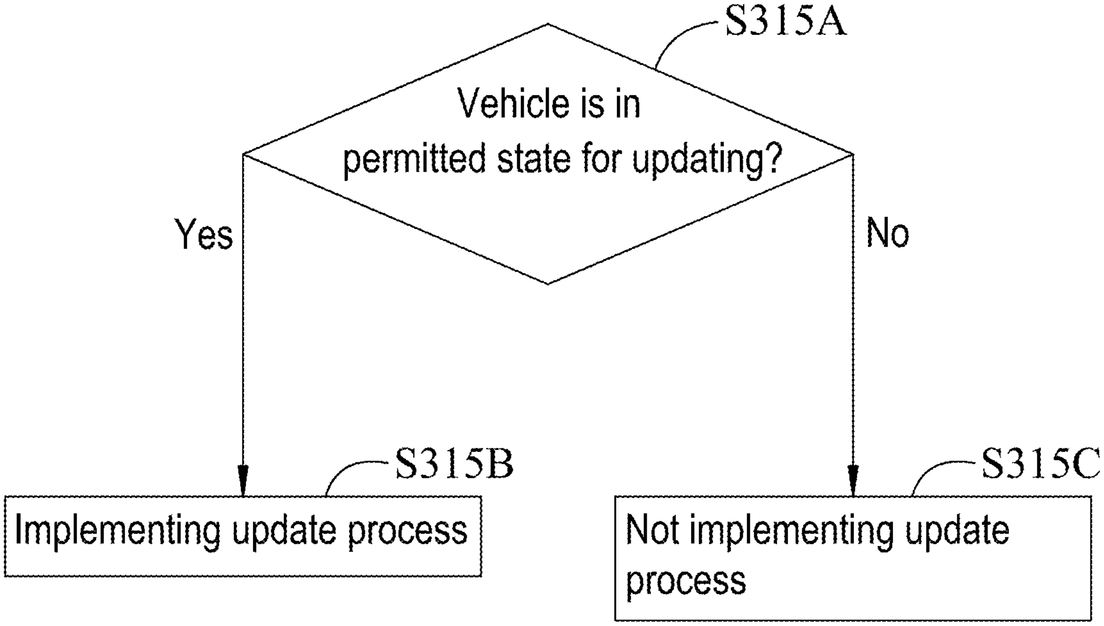

Referring to FIGS. 2 to 4, a first embodiment of an updating method that prevents unauthorized modification of information according to the disclosure is illustrated. The updating method is adapted to be implemented by the updating system 100 that is previously described. The updating method includes steps S301 to S315 delineated below.

In step S301, the processor 13 of the server device 1 calculates the reference pre-encryption hash value by using the hashing algorithm based on the original update file, and stores the reference pre-encryption hash value in the storage 12 of the server device 1.

In step S302, the processor 13 of the server device 1 encrypts the original update file with the algorithm for encryption and decryption to obtain the encrypted update file, stores the encrypted update file in the storage 12 of the server device 1, and sends the encrypted update file to the client device 2 via the communication module 11 of the server device 1.

In step S303, the processor 13 of the server device 1 calculates the reference post-encryption hash value by using the hashing algorithm based on the encrypted update file, and stores the reference post-encryption hash value in the storage 12 of the server device 1.

In step S304, in response to receipt of the encrypted update file from the server device 1 via the communication module 21 of the client device 2, the processor 23 of the client device 2 stores the encrypted update file in the storage 22 of the client device 2, calculates an asserted post-encryption hash value by using the hashing algorithm based on the encrypted update file, and sends the asserted post-encryption hash value to the server device 1 via the communication module 21 of the client device 2.

In step S305, in response to receipt of the asserted post-encryption hash value from the client device 2 via the communication module 11 of the server device 1, the processor 13 of the server device 1 determines whether the asserted post-encryption hash value conforms with the reference post-encryption hash value. In response to determining that the asserted post-encryption hash value does not conform with the reference post-encryption hash value, a procedure flow of the updating method proceeds to step S306. On the other hand, in response to determining that the asserted post-encryption hash value conforms with the reference post-encryption hash value, the procedure flow proceeds to step S308.

In step S306, the processor 13 of the server device 1 generates a first stop command for stopping the procedure flow of the updating method, and sends the first stop command to the client device 2 via the communication module 11 of the server device 1.

In step S307, in response to receipt of the first stop command from the server device 1 via the communication module 21 of the client device 2, the processor 23 of the client device 2 stops implementation of the updating method. The procedure flow comes to an end.

In step S308, the processor 13 of the server device 1 generates a first update command, and sends the first update command to the client device 2 via the communication module 11 of the server device 1.

In step S309, in response to receipt of the first update command from the server device 1 via the communication module 21 of the client device 2, the processor 23 of the client device 2 decrypts the encrypted update file with the algorithm for encryption and decryption to obtain the original update file.

In step S310, the processor 23 of the client device 2 calculates an asserted pre-encryption hash value by using the hashing algorithm based on the original update file that is obtained by decrypting the encrypted update file, and sends the asserted pre-encryption hash value to the server device 1 via the communication module 21 of the client device 2.

In step S311, in response to receipt of the asserted pre-encryption hash value from the client device 2 via the communication module 11 of the server device 1, the processor 13 of the server device 1 determines whether the asserted pre-encryption hash value conforms with the reference pre-encryption hash value. In response to determining that the asserted pre-encryption hash value does not conform with the reference pre-encryption hash value, the procedure flow proceeds to step S312. Otherwise, in response to determining that the asserted pre-encryption hash value conforms with the reference pre-encryption hash value, the procedure flow proceeds to step S314.

In step S312, the processor 13 of the server device 1 generates a second stop command for stopping the procedure flow of the updating method, and sends the second stop command to the client device 2 via the communication module 11 of the server device 1.

In step S313, in response to receipt of the second stop command from the server device 1 via the communication module 21 of the client device 2, the processor 23 of the client device 2 stops implementation of the updating method. The procedure flow terminates.

In step S314, the processor 13 of the server device 1 generates a second update command, and sends the second update command to the client device 2 via the communication module 11 of the server device 1.

In step S315, in response to receipt of the second update command from the server device 1 via the communication module 21 of the client device 2, the processor 23 of the client device 2 implements an update process using the original update file. In some embodiments, step S315 includes sub-steps S315A to S315C as shown in FIG. 4.

In sub-step S315A, in response to receipt of the second update command, the processor 23 of the client device 2 determines whether the vehicle is in a permitted state for updating. In response to determining that the vehicle is in the permitted state for updating, the procedure flow proceeds to step S315B. Oppositely, in response to determining that the vehicle is not in the permitted state for updating, the procedure flow proceeds to step S315C.

In sub-step S315B, the processor 23 of the client device 2 implements the update process using the original update file.

In sub-step S315C, the processor 23 of the client device 2 stops implementation of the updating method. The procedure flow terminates.

In particular, the permitted state for updating is defined according to standards of UNECE Regulation No. 156 (Software update and software update management system) and ISO 24089 (Road vehicles—software update engineering). Specifically, the processor 23 of the client device 2 determines whether the vehicle is in the permitted state for updating by determining at least one of whether an amount of electricity of the vehicle is greater than a preset threshold, whether the vehicle is not moving, whether there is any obstacle around the vehicle, whether a confirmation signal that is generated based on a user operation and that indicates a confirmation of updating is received, and whether the vehicle is locked. In this embodiment, the processor 23 of the client device 2 determines that the vehicle is in the permitted state for updating when it is determined that the amount of electricity is greater than the preset threshold, the vehicle is not moving, there is no obstacle around the vehicle, the confirmation signal is received, and the vehicle is locked; the processor 23 of the client device 2 determines that the vehicle is not in the permitted state for updating when it is determined that the amount of electricity is not greater than the preset threshold, the vehicle is moving, there is/are obstacle(s) around the vehicle, the confirmation signal is not received, or the vehicle is unlocked. It is worthy of note that since a user (e.g., a driver) of the vehicle is able to decide whether or not to operate the client device 2 to generate the confirmation signal at any time, a time point at which the update process starts to be implemented is thereby determined by the user.

Figure 5:
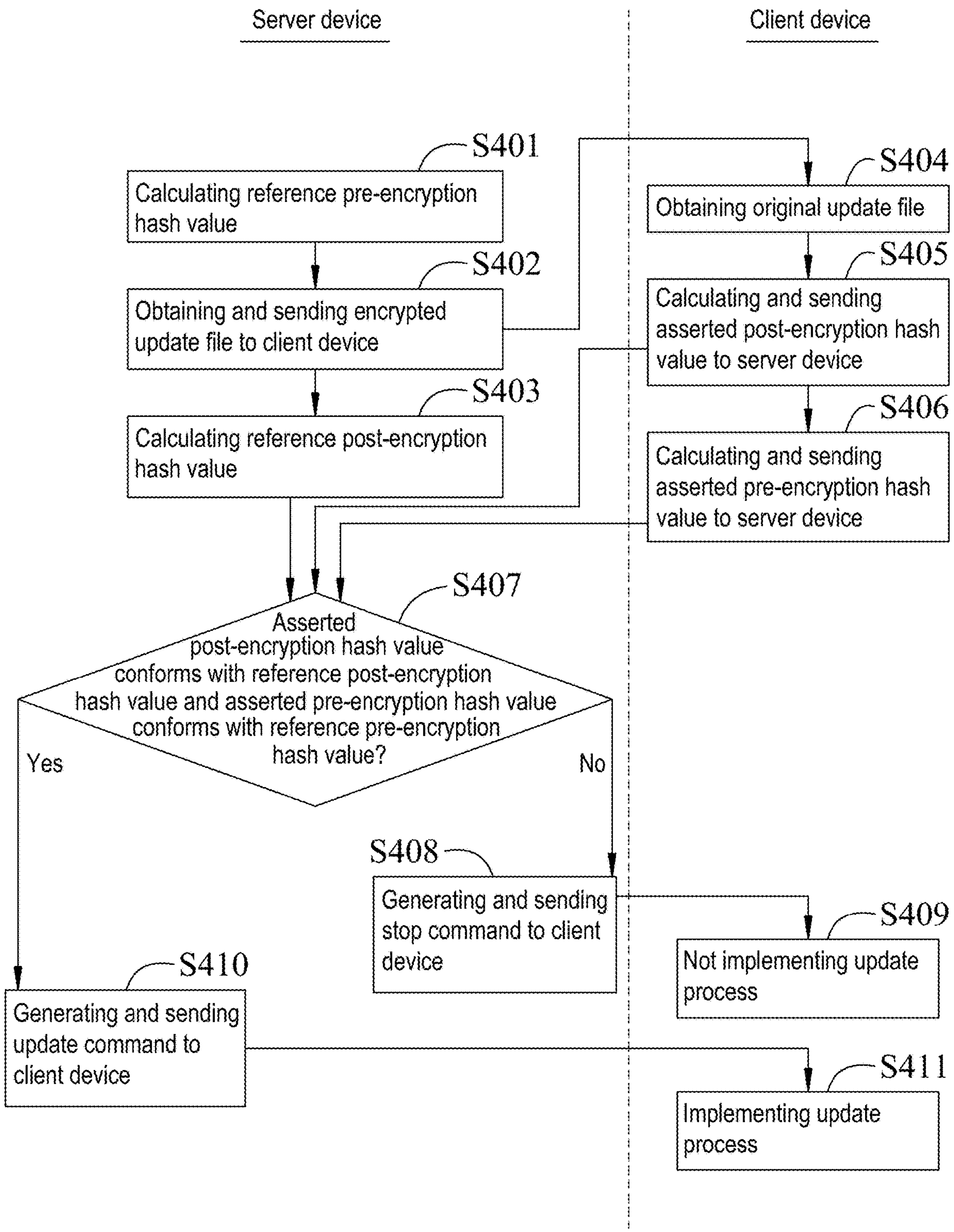
FIG. 5 is a flow chart illustrating the updating method according to a second embodiment of the disclosure.

Referring to FIG. 5, a second embodiment of the updating method according to the disclosure is illustrated. The updating method includes steps S401 to S411 delineated below.

In step S401, the processor 13 of the server device 1 calculates the reference pre-encryption hash value by using the hashing algorithm based on the original update file, and stores the reference pre-encryption hash value in the storage 12 of the server device 1.

In step S402, the processor 13 of the server device 1 encrypts the original update file with the algorithm for encryption and decryption to obtain the encrypted update file, stores the encrypted update file in the storage 12 of the server device 1, and sends the encrypted update file to the client device 2 via the communication module 11 of the server device 1.

In step S403, the processor 13 of the server device 1 calculates the reference post-encryption hash value by using the hashing algorithm based on the encrypted update file, and stores the reference post-encryption hash value in the storage 12 of the server device 1.

In step S404, in response to receipt of the encrypted update file from the server device 1 via the communication module 21 of the client device 2, the processor 23 of the client device 2 decrypts the encrypted update file with the algorithm for encryption and decryption to obtain the original update file. In some embodiments, the processor 23 of the client device 2 further stores the encrypted update file in the storage 22 of the client device 2.

In step S405, the processor 23 of the client device 2 calculates an asserted post-encryption hash value by using the hashing algorithm based on the encrypted update file, and sends the asserted post-encryption hash value to the server device 1 via the communication module 21 of the client device 2.

In step S406, the processor 23 of the client device 2 calculates an asserted pre-encryption hash value by using the hashing algorithm based on the original update file that is obtained by decrypting the encrypted update file, and sends the asserted pre-encryption hash value to the server device 1 via the communication module 21 of the client device 2.

In step S407, in response to receipt of the asserted post-encryption hash value and the asserted pre-encryption hash value from the client device 2 via the communication module 11 of the server device 1, the processor 13 of the server device 1 determines whether the asserted post-encryption hash value conforms with the reference post-encryption hash value, and determines whether the asserted pre-encryption hash value conforms with the reference pre-encryption hash value. In response to determining that the asserted post-encryption hash value does not conform with the reference post-encryption hash value or that the asserted pre-encryption hash value does not conform with the reference pre-encryption hash value, the procedure flow proceeds to step S408. Otherwise, in response to determining that the asserted post-encryption hash value conforms with the reference post-encryption hash value and that the asserted pre-encryption hash value conforms with the reference pre-encryption hash value, the procedure flow proceeds to step S410.

In step S408, the processor 13 of the server device 1 generates a stop command for stopping the procedure flow of the updating method, and sends the stop command to the client device 2 via the communication module 11 of the server device 1.

In step S409, in response to receipt of the stop command from the server device 1 via the communication module 21 of the client device 2, the processor 23 of the client device 2 stops implementation of the updating method. The procedure flow terminates.

In step S410, the processor 13 of the server device 1 generates an update command, and sends the update command to the client device 2 via the communication module 11 of the server device 1.

In step S411, in response to receipt of the update command from the server device 1 via the communication module 21 of the client device 2, the processor 23 of the client device 2 implements an update process using the original update file.

U.S. Pat. No. 9,464,905B2 discloses a method (hereinafter referred to as a conventional method) of updating a vehicle ECU (electronic control unit). The conventional method includes steps of: establishing communication between a data communications module of a vehicle and an update server via a cellular network; validating the vehicle using a key exchange protocol between the data communications module and the update server; and sending update information from the update server to the data communications module of the vehicle via the cellular network, wherein the update information is configured to be used to update the vehicle ECU. The conventional method can be used to provide updates to various ECUs (and other systems) of a vehicle without requiring a vehicle owner of the vehicle to transport the vehicle to a vehicle manufacturer, while also providing security protocols which can validate an update source, update destination and/or update communications themselves. However, the conventional method may be prone to risks of data security, e.g., the update information for updating a vehicle ECU may be maliciously modified.

Comparatively, for the updating method and the updating system according to the disclosure, besides encryption and decryption of the original update file, a double-checking mechanism is realized by checking conformity of each of two pairs of hash values, i.e., checking conformity between the asserted pre-encryption hash value and the reference pre-encryption hash value, and checking conformity between the asserted post-encryption hash value and the reference post-encryption hash value. In this way, data security for the update process may be enhanced. Moreover, a confirmation as to whether a vehicle is in the permitted state for updating is made before the start of the update process, so failure of the update process may be prevented, and safety and reliability of the update process may be ensured.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An updating system that prevents unauthorized modification of information, comprising:
 a client device; and
 a server device
  electrically connected to said client device,
  storing an original update file for updating said client device, an encrypted update file that is obtained by encrypting the original update file with an algorithm for encryption and decryption, a reference pre-encryption hash value that is calculated by using a hashing algorithm based on the original update file, and a reference post-encryption hash value that is calculated by using the hashing algorithm based on the encrypted update file, and
  sending the encrypted update file to said client device;
 wherein said client device,
  in response to receipt of the encrypted update file from said server device, decrypts the encrypted update file with the algorithm for encryption and decryption to obtain the original update file, calculates an asserted post-encryption hash value by using the hashing algorithm based on the encrypted update file thus received, sends the asserted post-encryption hash value to said server device, calculates an asserted pre-encryption hash value by using the hashing algorithm based on the original update file that is obtained by decrypting the encrypted update file, and sends the asserted pre-encryption hash value to said server device;

wherein said server device determines whether the asserted post-encryption hash value received from said client device conforms with the reference post-encryption hash value, determines whether the asserted pre-encryption hash value received from said client device conforms with the reference pre-encryption hash value, and, in response to determining that the asserted post-encryption hash value conforms with the reference post-encryption hash value and that the asserted pre-encryption hash value conforms with the reference pre-encryption hash value, generates and sends to said client device an update command for enabling said client device to implement an update process; and wherein said client device, in response to receipt of the update command, implements the update process using the original update file.

2. The updating system as claimed in claim 1, wherein:

said client device includes an in-vehicle device mounted on a vehicle; and said client device, in response to receipt of the update command, determines whether the vehicle is in a permitted state for updating, and in response to determining that the vehicle is in the permitted state for updating, implements the update process using the original update file.

3. The updating system as claimed in claim 2, wherein:

said client device determines whether the vehicle is in the permitted state for updating by determining whether an amount of electricity of the vehicle is greater than a preset threshold, whether the vehicle is not moving, and whether a confirmation signal that is generated based on a user operation and that indicates a confirmation of updating is received, and determines that the vehicle is in the permitted state for updating when it is determined that the amount of electricity is greater than the preset threshold, the vehicle is not moving, and the confirmation signal is received.

4. An updating method that prevents unauthorized modification of information, and is to be implemented by a server device, the server device being electrically connected to a client device, and storing an original update file for updating the client device, an encrypted update file that is obtained by encrypting the original update file with an algorithm for encryption and decryption, a reference pre-encryption hash value that is calculated by using a hashing algorithm based on the original update file, and a reference post-encryption hash value that is calculated by using the hashing algorithm based on the encrypted update file, the updating method comprising:

sending the encrypted update file to the client device to enable the client device to calculate an asserted post-encryption hash value by using the hashing algorithm based on the encrypted update file, and to send the asserted post-encryption hash value to the server device;

in response to receipt of the asserted post-encryption hash value from the client device, determining whether the asserted post-encryption hash value conforms with the reference post-encryption hash value;

in response to determining that the asserted post-encryption hash value conforms with the reference post-encryption hash value, generating and sending a first update command to the client device to enable the client device to decrypt the encrypted update file with the algorithm for encryption and decryption to obtain the original update file, to calculate an asserted pre-encryption hash value by using the hashing algorithm based on the original update file that is obtained by decrypting the encrypted update file, and to send the asserted pre-encryption hash value to the server device;

in response to receipt of the asserted pre-encryption hash value from the client device, determining whether the asserted pre-encryption hash value conforms with the reference pre-encryption hash value; and in response to determining that the asserted pre-encryption hash value conforms with the reference pre-encryption hash value, generating and sending to the client device a second update command to enable the client device to implement an update process using the original update file.

5. The updating method as claimed in claim 4, the client device including an in-vehicle device mounted on a vehicle, wherein in generating and sending to the client device the second update command, the second update command generated by the server device further enables the client device to determine whether the vehicle is in a permitted state for updating, and in response to determining that the vehicle is in the permitted state for updating, to implement the update process using the original update file.

6. The updating method as claimed in claim 5, wherein:

in generating and sending to the client device the second update command, the second update command generated by the server device further enables the client device to determine whether the vehicle is in the permitted state for updating by determining whether an amount of electricity of the vehicle is greater than a preset threshold, whether the vehicle is not moving, and whether a confirmation signal that is generated based on a user operation and that indicates a confirmation of updating is received; and the client device determines that the vehicle is in the permitted state for updating when it is determined that the amount of electricity is greater than the preset threshold, the vehicle is not moving, and the confirmation signal is received.

7. An updating method that prevents unauthorized modification of information, and is to be implemented by a client device, the client device being electrically connected to a server device that stores an original update file for updating the client device, an encrypted update file which is obtained by encrypting the original update file with an algorithm for encryption and decryption, a reference pre-encryption hash value which is calculated by using a hashing algorithm based on the original update file, and a reference post-encryption hash value which is calculated by using the hashing algorithm based on the encrypted update file, the updating method comprising:

in response to receipt of the encrypted update file from the server device, calculating an asserted post-encryption hash value by using the hashing algorithm based on the encrypted update file, and sending the asserted post-encryption hash value to the server device to enable the server device to generate and send a first update command to the client device when the server device determines that the asserted post-encryption hash value conforms with the reference post-encryption hash value;

in response to receipt of the first update command, decrypting the encrypted update file with the algorithm for encryption and decryption to obtain the original update file, calculating an asserted pre-encryption hash value by using the hashing algorithm based on the original update file that is obtained by decrypting the encrypted update file, and sending the asserted pre-encryption hash value to the server device to enable the server device to generate and send a second update command to the client device when the server device determines that the asserted pre-encryption hash value conforms with the reference pre-encryption hash value; and in response to receipt of the second update command, implementing an update process using the original update file.

8. The updating method as claimed in claim 7, the client device including an in-vehicle device mounted on a vehicle, the updating method further comprising, in response to receipt of the second update command, determining whether the vehicle is in a permitted state for updating, and in response to determining that the vehicle is in the permitted state for updating, implementing the update process using the original update file.

9. The updating method as claimed in claim 8, wherein:

determining whether the vehicle is in a permitted state for updating includes determining, by the client device, whether an amount of electricity of the vehicle is greater than a preset threshold, whether the vehicle is not moving, and whether a confirmation signal that is generated based on a user operation and that indicates a confirmation of updating is received; and the client device determines that the vehicle is in the permitted state for updating when it is determined that the amount of electricity is greater than the preset threshold, the vehicle is not moving, and the confirmation signal is received.

* * * * *